Oct. 24, 1939.   J. A. MAXWELL ET AL   2,177,575
TRAY
Filed March 20, 1939
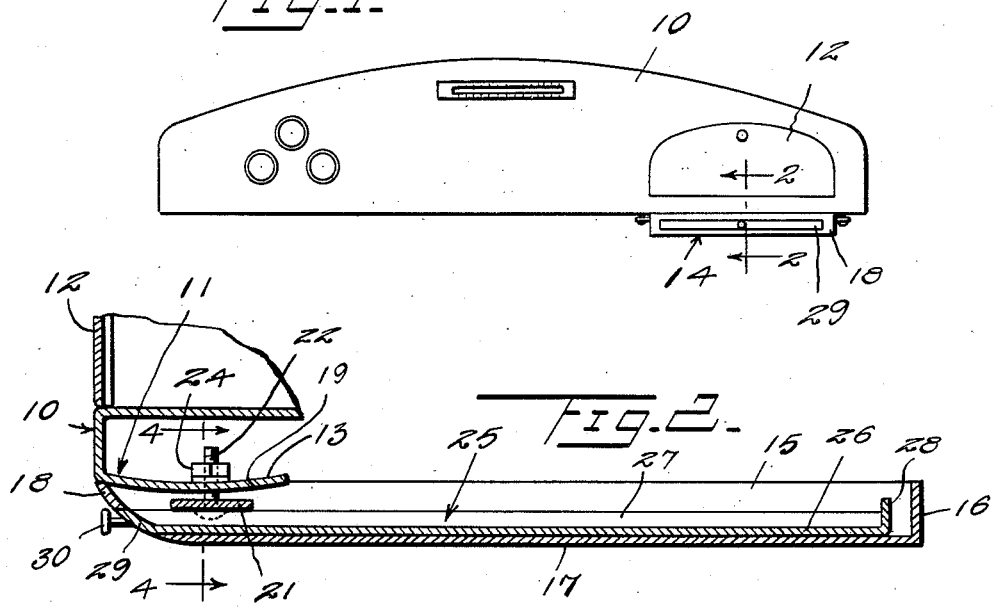
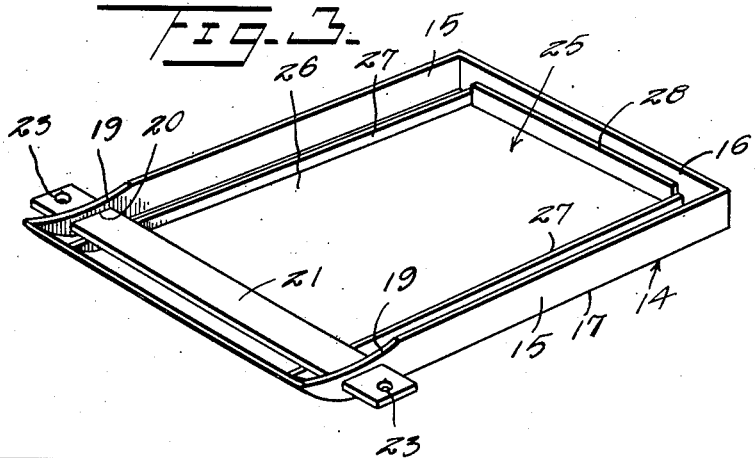
Inventors
J.A.Maxwell, C.L.Duggan,
O.S.Crosthwaite.
By
Kimmel & Crowell   Attorneys Patented Oct. 24, 1939

2,177,575

UNITED STATES PATENT OFFICE 2,177,575

TRAY

Joseph A. Maxwell, Owen S. Crosthwaite, and Claude L. Duggan, Drew, Miss., assignors of one-fourth to Oley P. Gooch, Cleveland, Miss.

Application March 20, 1939, Serial No. 262,982

3 Claims. (Cl. 311—21)

This invention relates to trays and particularly to a tray adapted to be mounted on the interior of a motor vehicle.

An object of this invention is to provide an improved tray and supporting and attaching means therefor so that the tray may be readily secured to the present parts of a motor vehicle without affecting the present parts of the vehicle.

Another object of this invention is to provide in a tray an improved supporting means therefor in the form of a supporting bar which is provided not only for the purpose of securing the tray to the dashboard of a motor vehicle but also for the purpose of providing a guide means for guiding the tray in and out and also for holding the tray in a substantially horizontal position, in addition to limiting the outward movement of the tray.

A further object of this invention is to provide an improved tray structure of this kind which is exceedingly simple in construction so that it may be manufactured at a relatively small cost and can be easily and quickly applied beneath the dashboard and glove or article compartment at present forming part of the motor vehicle.

Embodying the objects aforesaid and others which may hereinafter appear, the invention consists of the novel construction, combination and arrangement of parts as will be more specifically referred to and illustrated in the accompanying drawing, wherein is shown an embodiment of the invention, but it is to be understood that changes, variations and modifications may be resorted to which fall within the scope of the invention as claimed.

In the drawing:

Figure 1 is a detail front elevation of a vehicle dashboard having a tray constructed according to an embodiment of this invention mounted thereon, Figure 2 is a sectional view taken on the line 2--2 of Figure 1, Figure 3 is a perspective view of the tray and mounting means therefor, and Figure 4 is a fragmentary sectional view taken on the line 4—4 of Figure 2.

Referring to the drawing, the numeral 10 designates generally a dashboard which in the present motor vehicles is constructed of metal and is provided at its lower edge with an inturned flange 11. The dashboard 10 is provided with a compartment 12 in which various articles are adapted to be placed and the flange 11 extends inwardly beneath the compartment 12. The flange 11 is transversely curved as at 13.

In order to provide a means whereby a tray structure may be supported beneath the glove compartment 12, I have provided a box-like supporting member 14 which includes longitudinal or side walls 15, an inner end wall 16, a bottom 17 and a front or outer wall 18. The front wall 18 is transversely curved so as to conform substantially to the curvature of the panel or dashboard 10, and each side wall 15 of the supporting member 14 is provided adjacent the forward or front end thereof with an arcuate recess or cutout portion 19 conforming to the curvature of the flange 11 so that the side walls 15 will snugly engage the underside of the flange 11.

The side walls 15 adjacent the forward end thereof are each provided with a rectangular opening 20 which is adapted to be positioned substantially below the flange 11 and an elongated tray supporting bar 21 is extended through the openings 20 and has the opposite ends thereof projecting laterally or beyond the side walls 15. A pair of attaching bolts 22 are extended through openings 23 provided in the extended end portions of the supporting bar 21 and are then extended through openings provided in the flange 11. A nut 24 is threaded onto the bolt 23 and may engage on the upper side of the flange 11, or if desired the bolt 23 may be reversed with the head thereof engaging the upper side of the flange 11 and the nut 24 engaging on the underside of the bar 21.

A tray structure 25 is disposed within the supporting member 14 and is provided with a bottom wall 26, side walls 27, an inner end wall 28 and a forward or front wall 29. The bottom wall 26 of the tray 25 is adapted to slidingly engage the bottom 17 of the supporting member 14 and preferably the rear wall 28 has a height substantially greater than the height of the side walls 27 so that when the tray 25 is in extended position, the rear wall 28 will have the upwardly projecting portion thereof engage against the inner edge of the supporting bar 21. In this manner the supporting bar 21 will limit the extension of the tray 25. The supporting bar 21 is so positioned in the supporting member 14 relative to the tray 25 so that the upper edges of the side walls 27 of the tray will slidingly contact with the underside of the bar 14. In this manner the supporting bar 14 will not only limit the extension of the tray 25, but will at all times support or hold the tray 25 in a horizontal position.

The forward wall 29 of the tray 25 is transversely curved so as to conform to the configuration of the front wall 18 of the supporting member 14 and a knob 30 is secured in the longitudinal center of the front wall 29.

In the use of this tray structure, the supporting member 14 is secured by means of the bolts 23 beneath the dashboard 10 to the flange 11. The bolts 23 will firmly hold the supporting member 14 in a horizontal position although if desired an additional support may be provided rearwardly of the forward end of the supporting member 14. The tray 25 is provided with relatively narrow or shallow side walls which are of such a height as to prevent articles from sliding off of the bottom 26. When the tray 25 is in fully extended position, the rear wall 28 will be in contacting relation with the supporting bar 21. At this time, the side walls 27 of the tray will also be in contacting relation with the underside of the supporting bar 21 and the bottom 26 of the tray will be in contact with the bottom 17 of the supporting member.

With a construction of this kind, the entire tray and supporting means therefor with the exception of the bar, may be made out of sheet metal and due to the relatively simple construction of the tray and the parts associated therewith the entire structure can be manufactured at a relatively small cost and can be easily and quickly applied to the present parts of a motor vehicle without affecting the condition or arrangement of such vehicle parts.

We claim:

1. A tray for mounting beneath the dashboard of a motor vehicle comprising a guide plate, upstanding side walls carried by said plate, an upstanding end wall carried by said plate, each of said side walls having an elongated opening therein adjacent the forward end thereof, an elongated flat bar extending through said openings and projecting at each end laterally of said side walls, a front wall carried by said plate provided with an elongated opening, and a tray slidable on said plate through said opening, said tray engaging between said bar and said plate, the under surface of said bar holding said tray in horizontal position.

2. A tray for mounting beneath the dashboard of a motor vehicle comprising a guide plate, upstanding side walls carried by said plate, an upstanding end wall carried by said plate, each of said side walls having an elongated opening therein adjacent the forward end thereof, an elongated flat bar extending through said openings and projecting at each end laterally of said side walls, a front wall carried by said plate provided with an elongated opening, a tray slidable on said plate through said opening, said tray engaging between said bar and said plate, the under surface of said bar holding said tray in horizontal position, and an upstanding part carried by said tray at the inner end thereof engageable with said bar upon extension of said tray to limit the extension of said tray.

3. A tray for mounting beneath the dashboard of a motor vehicle, comprising a guide plate, upstanding side walls carried by said plate, said walls each having an elongated opening adjacent the forward end thereof, a front wall carried by said plate having an elongated opening therein, an elongated supporting bar extending through said openings in and beyond said side walls, means securing the extended ends of said bar to the dashboard, that portion of said bar between said walls being spaced from said guide plate, a tray slidingly engaging said plate between said bar and said plate, said tray comprising a bottom, upstanding side members, a front member, and a rear member having a height greater than said side members and adapted upon extension of the tray to engage against said bar to thereby limit the extension of the tray, the upper edges of said side members slidingly engaging the under side of said bar and coacting with said plate to hold said tray in a horizontal position.

JOSEPH A. MAXWELL.
OWEN S. CROSTHWAITE.
CLAUDE L. DUGGAN.